C. S. AND H. P. CARTER.
FINGER NAIL TRIMMER.
APPLICATION FILED FEB. 18, 1921.
1,436,010.
Patented Nov. 21, 1922.
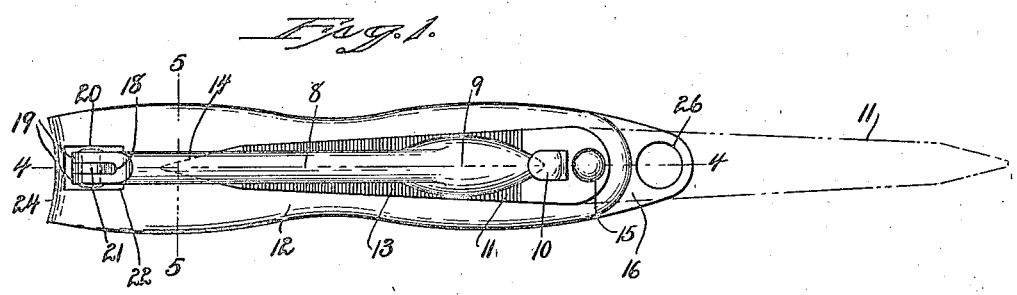
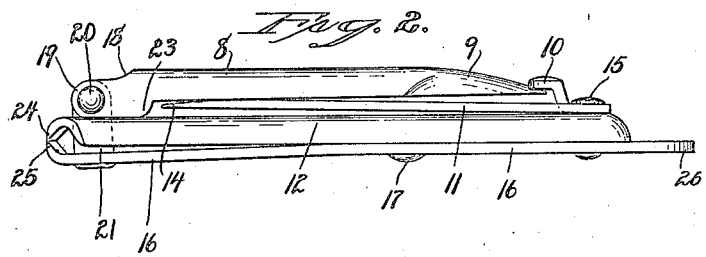 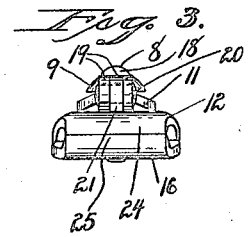
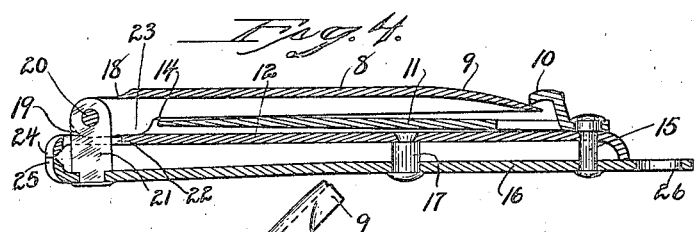 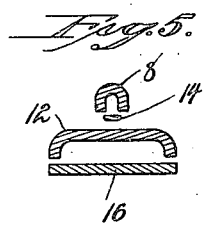
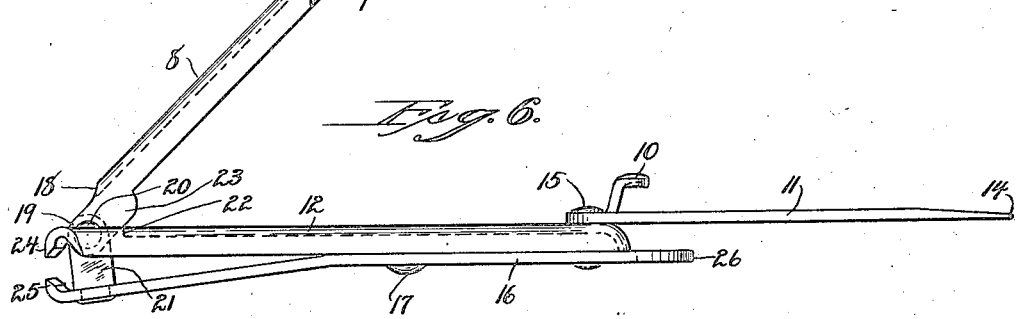
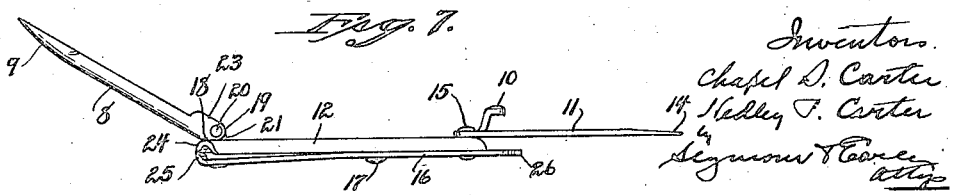

Patented Nov. 21, 1922.

1,436,010

UNITED STATES PATENT OFFICE.

CHAPEL S. CARTER AND HEDLEY P. CARTER, OF ANSONIA, CONNECTICUT, ASSIGNORS TO THE H. C. COOK CO., OF ANSONIA, CONNECTICUT, A CORPORATION.

FINGER-NAIL TRIMMER.

Application filed February 18, 1921. Serial No. 446,099.

*To all whom it may concern:*

Be it known that we, CHAPEL S. CARTER and HEDLEY P. CARTER, citizens of the United States, residing at Ansonia, in the county of New Haven and State of Connecticut, have invented a new and useful Improvement in Finger-Nail Trimmers; and we do hereby declare the following, when taken in connection with the accompanying drawings and the characters of reference marked thereon, to be a full, clear, and exact description of the same, and which said drawings constitute part of this application, and represent, in—

Fig. 1 an enlarged plan view of a finger-nail trimmer constructed in accordance with our invention, the file being shown by broken lines in its extended position.

Fig. 2 a view thereof in side elevation.

Fig. 3 a view thereof in front elevation.

Fig. 4 a view thereof in vertical central longitudinal section on the line 4—4 of Fig. 1.

Fig. 5 a view thereof in transverse section on the line 5—5 of Fig. 1.

Fig. 6 a view thereof in side elevation with its operating-lever in its nail-trimming position and its file in its extended position, the spoon-shaped outer end of the said lever being broken away.

Fig. 7 a view of the device in side elevation with its operating-lever and nail-file in their full open positions.

Our invention relates to an improved finger-nail trimmer, the object being to produce at a low cost for manufacture, a simple, convenient and efficient toilet-accessory of the character described. With these ends in view, our invention consists in a finger-nail trimmer having certain details of construction and combination of parts as will be hereinafter described and pointed out in the claims.

In carrying out our invention as herein shown, we employ an operating-lever 8, which is given desired bulk, strength and lightness by forming it of a piece of wrought-metal folded lengthwise into inverted U-shaped form in cross-section, its convex face being uppermost, so as to present a smooth surface to the hand and to the lining of the pocket. At its outer end this lever is symmetrically flattened to form a spoon-shaped nail-cleaner 9, which serves to burnish as well as clean the nails. For holding the said lever in its closed position the point of the said nail-cleaner 9 is caught under a forwardly-opening retaining-finger 10, struck up from the butt or inner end of a file 11, which normally rests directly upon the flat upper face of the relatively rigid jaw-member 12 of the device in alignment therewith. The said file has its upper face serrated, as at 13, and terminates in a point 14, also adapted to be used for cleaning the nails. At its inner end the file is pivotally mounted upon the enlarged bearing portion at the upper end of a rivet 15, the shank of which passes downward through the inner end of the rigid jaw-member 12 and through the inner end of the spring jaw-member 16, upon the lower face of which it is headed over, as clearly shown in Figure 4, whereby the rivet 15 is made to serve the double purpose of securing the upper and lower jaw-members together and of pivotally mounting the file 11. The upper and lower jaw-members 12 and 16 are also secured together by means of an aligning rivet 17, whereby the alignment of the two jaw-members is maintained.

At its forward end, the U-shaped operating-lever is formed with a transverse clearance-notch 18, which permits it to be swung over into its full open position as shown in Figure 7. The extreme forward end of the said lever is rounded to form a pair of ears 19, perforated to receive a pivot 20 passing through the upper end of a post 21 riveted at its lower end in the outer end of the spring jaw-member 16. The forward end of the said lever extends downward, when the lever is lifted, into a slot 22 in the forward end of the upper jaw-member 12, as shown in Figure 6, the rear wall of the slot 22 being, at this time, engaged by two lifting-cams 23 formed upon the forward ends of the side walls of the lever for lifting the spring, lower jaw-member with respect to the relatively rigid upper jaw-member to bring their cutting-edges 24 and 25 together, as the lever is pressed downward into its closed position from which it is lifted into its nail-trimming position by the spring of the said spring-member, as soon as downward pressure is removed from its upper face. The lower jaw-member is extended at its inner end beyond the rivet 15 to form a perforated suspension-arm 26, by means of which the device is attached to the watch-chain or the key-chain of the user. The nail-file 11, when swung in to its open position, greatly increases the over-all length of the device and enables the hand to conveniently grip and manipulate it. When the lever is thrown over into its full open position the bevelled inner wall of its clearance-notch 18 engages with the forward wall of the slot 21 in the upper jaw-member 12, whereby the lever is supported in this position.

We claim:

1. In a finger-nail trimmer, the combination with the upper and lower jaw-members thereof, of a pivotally mounted operating-lever connecting the forward ends of the said jaw-members for the operation thereof, a nail file pivotally mounted upon the rear end of the upper face of the said upper jaw-member, so as to swing at a right angle to the movement of the said operating-lever in a plane between the same and the upper jaw-member, and means upstanding from the rear end of the said file at a point forward of the pivot thereof, for engagement by the tip of the said lever.

2. In a finger-nail trimmer, the combination with the upper and lower jaw-members thereof, of a pivotally mounted operating-lever connecting the forward ends of the said jaw-members for the operation thereof, a rivet passing through the rear ends of the said jaw-members for connecting the same and projecting upward through the rear end of the upper face of the upper jaw-member, a nail file pivotally mounted upon the projecing upper end of the said rivet, so as to swing in a plane at a right angle to the movement of the said operating-lever and between the same and the upper face of the upper jaw-member, and means upstanding from the rear end of the said file at a point close to but forward of the said pivot for engagement by the tip of the said lever for holding the same in its closed position in which it lies in line with and over the said nail file.

3. In a finger-nail trimmer, the combination with the upper and lower jaw-members thereof, of a pivotally mounted operating-lever connecting the forward ends of the said jaw-members for the operation thereof, a rivet for uniting the rear ends of the said jaw-members and projecting upward above the upper face of the upper jaw-member, a nail file pivotally mounted upon the projecting upper end of the said rivet, so as to lie in its closed position between the upper face of the upper jaw-member and the lower face of the said operating-lever, means upstanding from the upper face of the file at the rear end thereof and forward of the said rivet for being engaged with the tip of the said lever for holding the same in its closed position, and an aligning-rivet connecting the said jaw-members at a point between the cutting edges thereof and the said rivet and preventing their relative lateral displacement, the lower jaw-member being downwardly deflected at a point in front of the said aligning-rivet.

4. In a finger-nail trimmer, the combination with the two jaw-members thereof, of an operating-lever connecting the forward ends of the said jaws for the operation thereof, the said lever being of U-shaped cross-section and having the lower edges of its side flanges cut away for clearance and to produce at its forward end two lifting-cams which engage with the upper face of the upper jaw-member for lifting the lower jaw-member toward the same, a rivet uniting the rear ends of the said upper and lower jaw-members, a file pivotally mounted upon the projecting upper end of the said rivet, and, in its closed position, located between the upper face of the upper jaw-member and the lower face of the said lever the side flanges of which are cut away to provide clearance for it, and means upstanding from the rear end of the said file, at a point close to but forward of the said rivet for being engaged by the tip of the said lever for holding the same in its closed position.

In testimony whereof, we have signed this specification in the presence of two subscribing witnesses.

CHAPEL S. CARTER.
HEDLEY P. CARTER.

Witnesses:
ANNA M. COSTELLO,
FRANK H. BRADBURY.